Sept. 29, 1936.　　　　K. R. MANVILLE　　　　2,055,770
FIVE-SPEED VEHICLE TRANSMISSION
Filed Sept. 22, 1934　　　2 Sheets-Sheet 1
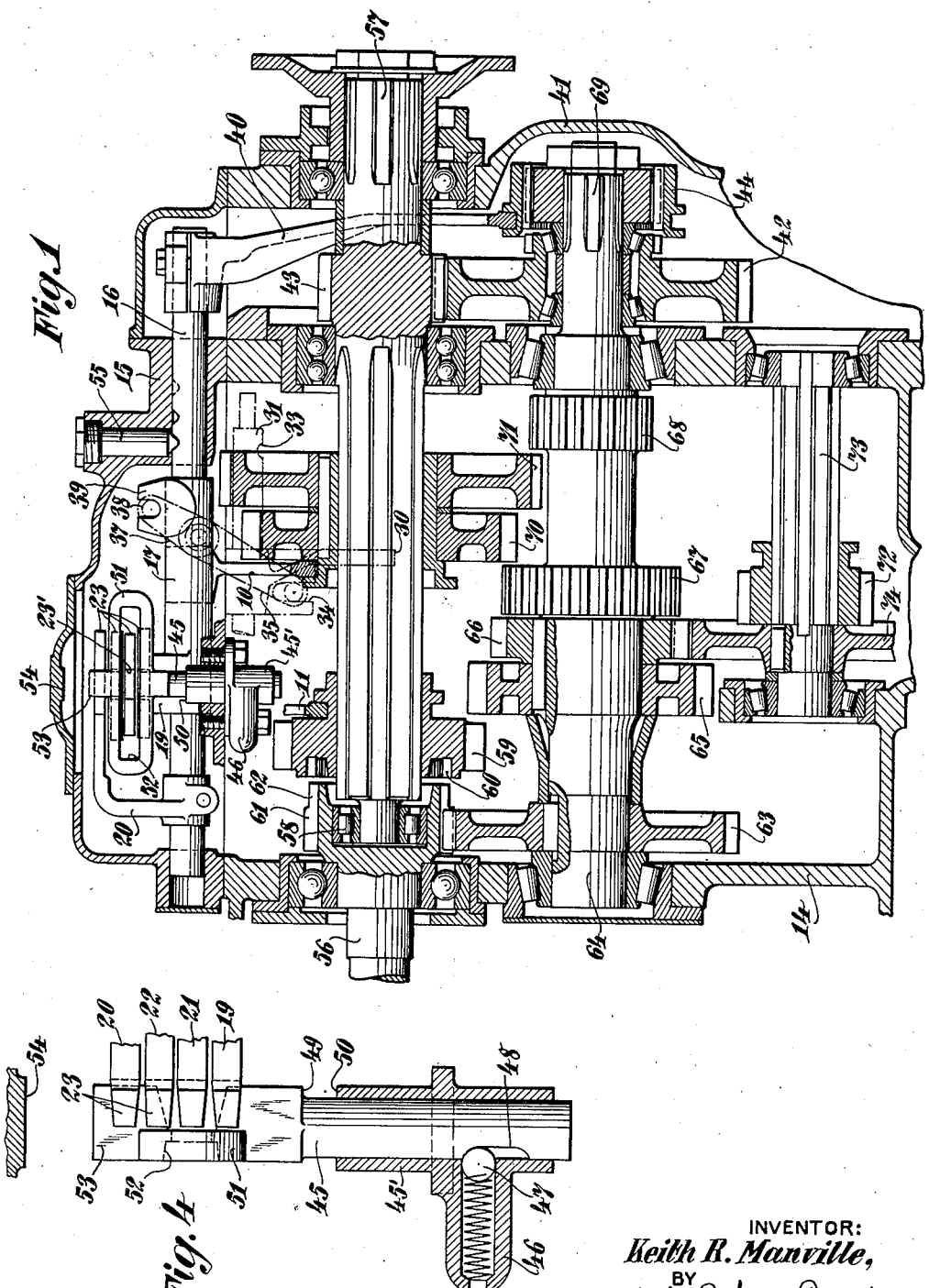
INVENTOR:
Keith R. Manville,
BY
Redding, Greeley, O'Shea & Campbell
HIS ATTORNEYS Sept. 29, 1936.　　　K. R. MANVILLE　　　2,055,770
FIVE-SPEED VEHICLE TRANSMISSION
Filed Sept. 22, 1934　　　2 Sheets-Sheet 2
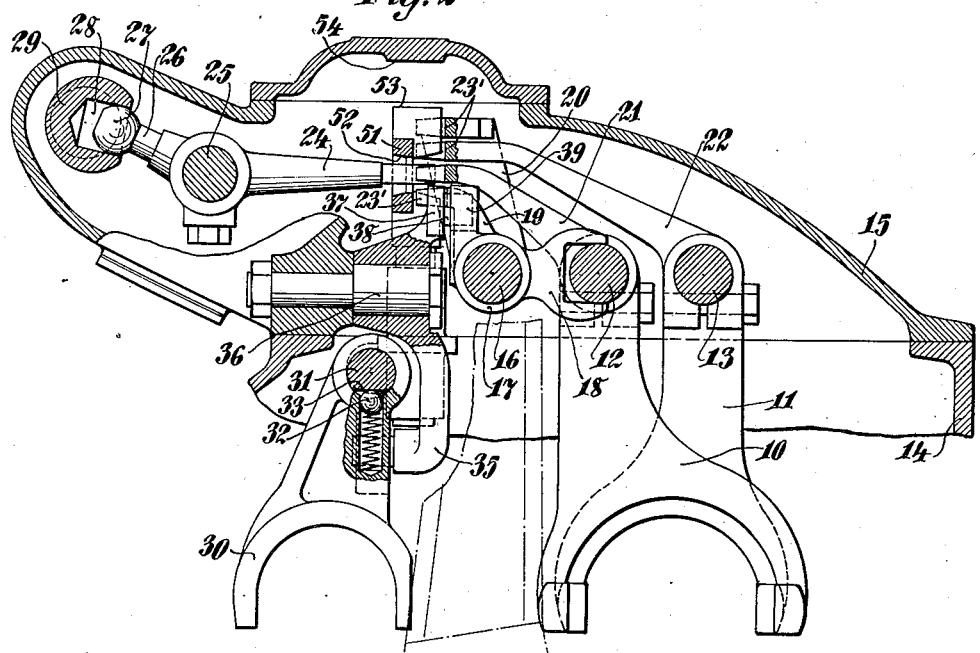
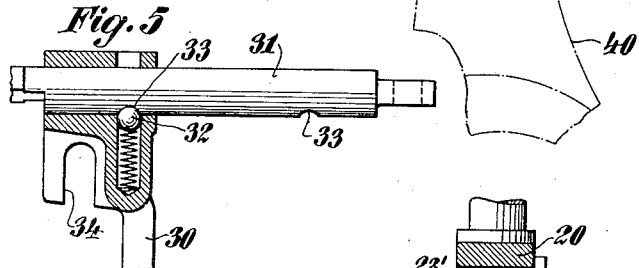
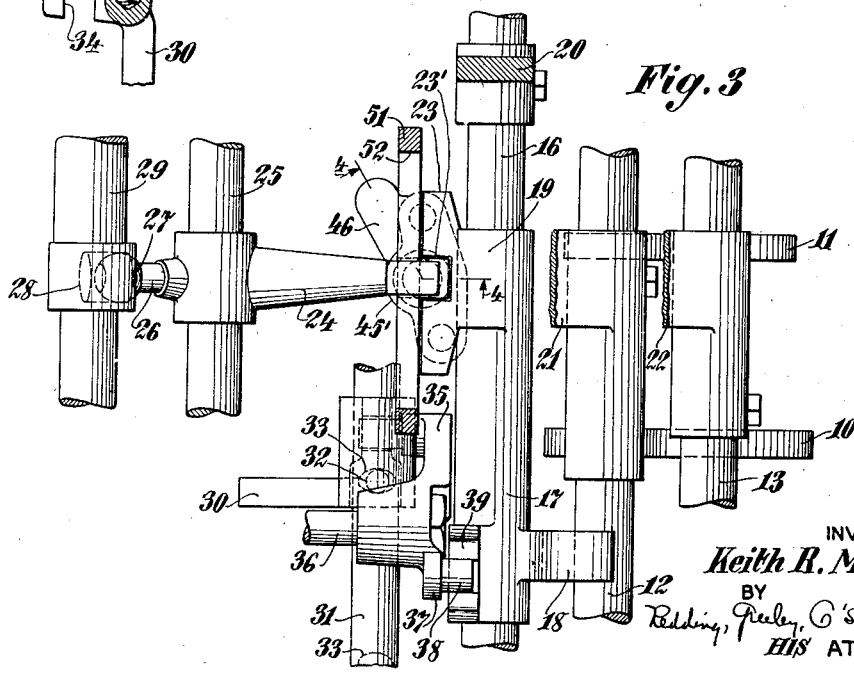
INVENTOR:
Keith R. Manville,
BY
Redding, Greeley, O'Shea & Campbell
HIS ATTORNEYS Patented Sept. 29, 1936

2,055,770

UNITED STATES PATENT OFFICE 2,055,770

FIVE-SPEED VEHICLE TRANSMISSION

Keith R. Manville, Highland Park, N. J., assignor to International Motor Company, New York, N. Y., a corporation of Delaware Application September 22, 1934, Serial No. 745,010

5 Claims. (Cl. 74—473)

The present invention relates to transmission mechanism for motor vehicles and embodies, more specifically, an improved controlling mechanism by means of which desired speed change connections may be selected and effected. More particularly, the invention embodies an improved controlling mechanism for transmissions having five forward speeds in addition to a reverse speed and wherein it is desirable to prevent accidental shifting into the fifth forward speed as well as the reverse speed connection.

The present application relates to subject matter somewhat akin to the subject matter covered in applicant's co-pending application Serial No. 745,011, filed August 22, 1934, for Four-speed vehicle transmission.

A further object of the invention is to provide a controlling mechanism for transmissions of the above character wherein the reverse and fifth speed shifting mechanism is conveniently and effectively mounted upon a common mounting means.

A further object of the invention is to provide, in combination with the controlling means for effecting the reverse and fifth speed shifting operations, a device for preventing the turning of the control mechanism about the axis of the common mounting means therefor.

Further objects, not specifically enumerated above, will be apparent as the invention is described in greater detail in connection with the accompanying drawings, wherein:

Figure 1 is a sectional view taken through a transmission mechanism constructed in accordance with the present invention, and showing certain improved features thereof.

Figure 2 is a view in transverse vertical section, taken through the transmission mechanism of Figure 1, and showing the controlling mechanism therefor only.

Figure 3 is a plan view of certain of the elements by means of which the transmission mechanism is controlled.

Figure 4 is an enlarged sectional view showing the locking mechanism by means of which accidental shifting into reverse and fifth speeds is prevented.

Figure 5 is a detail view showing a portion of the reverse shifter fork structure.

With reference to the above drawings, a transmission mechanism is shown in Figure 1 as mounted in a housing 14, upon which a cover 15 is adapted to be mounted. The cover carries slidable shifter rods 16, 12, and 13. Shifter rods 12 and 13 carry shifter forks 10 and 11, respectively, these forks serving to effect the first, second and third and fourth speed connections, respectively.

Upon the shifter rod 16, a reverse shifter sleeve 17 is slidably mounted, a fork 18 being formed thereon to engage the rod 12 to prevent rotation of the sleeve 17 about its axis. The sleeve 17 and the rods 16, 12 and 13 are actuated by means of shifter fingers 19, 20, 21, and 22, respectively, each of the fingers terminating in flanges 23 having vertically aligned recesses 23' formed therein. The recesses are engaged by the end of a shifter arm 24 which is slidably and rotatably mounted upon a guide rod 25 and formed with an arm 26, upon the end of which a ball extension 27 is formed. The ball extension 27 is received within a socket 28 formed in a shaft 29 which is rotatably and slidably mounted in the cover 15. Rotation of the shaft 29 thus causes the arm 24 to be moved in a vertical plane to position the end thereof in the desired recess 23', while axial movement of the shaft 29 effects the shifting operation of a selected member.

A reverse shifter fork 30 is slidably mounted upon a stationary guide shaft 31, the hub of the shifter fork being received to receive a spring-pressed ball 32 which is adapted to engage recesses 33 in the shaft 31. The hub of the fork 30 is also formed with a slot 34 within which the end of arm 35 is received. The arm 35 is pivoted upon a pivot pin 36 and is formed with an arm 37 having a pin 38 which is received within a bifurcated flange 39 formed upon the reverse sleeve 17. In this fashion, axial motion of the sleeve 17 effects the sifting of the reverse fork 30 to enable a reverse shifting operation to be performed.

The shifter rod 16 is provided with a shifter fork 40 which is received within an end cover plate 41 for the transmission. Within this cover plate, a pair of constant mesh gears 42, 43, is provided, the shifter fork 40 serving to actuate a clutch mechanism 44 to cause power to be transmitted through the gears 42, 43.

In order that accidental shifting of the mechanism into reverse and fifth speed connections may be prevented, a lock mechanism is provided including a shaft 45 which is mounted for slidable motion on a vertical axis within the housing 45'. A boss 46 in the housing 45' carries a spring-pressed ball 47 which is adapted to engage within an elongated recess 48 in the shaft 45, the axial motion of the shaft 45 thus being limited by the length of the groove 48. A flange 49 is also formed on shaft 45 and is adapted to engage the adjacent edge 50 of the housing 45' to serve as a stop to position the mechanism properly for effecting a shifting operation into the reverse speed connection. Shaft 45 is also formed with a flanged portion 51 within which a horizontal slot 52 is formed. Upon the upper side of the flanged portion 51 a boss 53 is formed, this boss being adapted to engage a properly spaced portion 54 of the cover 15 to position the members properly for perfecting a fifth speed shifting operation. The end of arm 24 is received within the slot 52 and it will thus be seen that vertical movement of the arm 24 to select first, second, or third and fourth speed connections may be accomplished with facility, the slot 48 being of such length as to accommodate this motion and limit the same in such fashion as to stop the arm 24 in engagement with the slot 23 formed in either of the fingers 21 or 22.

When a reverse speed connection is to be effected, the arm 24 must depress the shaft 45 and cause the ball 47 to move into the boss 46 until the ball is cleared by the shaft 45 at which time further downward motion of the shaft 45 is resisted only slightly. When the flange 49 engages the portion 50 of the casing, further movement of the members is prevented and the shifting operation may be perfected. The same operation takes place when it is desired to shift the mechanism into a fifth speed connection. In this operation, the arm 24 being moved upwardly to cause the ball 47 to engage the lower extremities of the slot 48. When the ball is forced out of the slot 48 the selection is completed by further motion of the shaft 45 until the boss 53 engages the adjacent surface 54. In such position the end of arm 24 is properly positioned within the notch 23' of the selector finger 20 and the shifting operation may be completed. Motion of the rod 16 with the sleeve 17 is prevented by means of a spring-pressed detent 55.

The transmission mechanism in connection with which the foregoing controlling device may be used is shown in Figure 1 and includes a drive shaft 56 which is journaled in the transmission housing and is coaxial with a driven shaft 57. The driven shaft is journaled at 58 in the end of the drive shaft 56 and is splined to carry, slidably, a gear 59 formed with internal clutch teeth 60. The driving shaft 56 is formed with gear teeth 61 and external clutch teeth 62 which are adapted to engage the internal clutch teeth 60. Gear 61 is in constant mesh with a driven gear 63 secured to a countershaft 64. Countershaft 64 is provided with gears 65, 66, 67 and 68 within the transmission housing and with a overhanging portion 69 within the end cover 41. Gear 42 is journaled upon the overhanging shaft section 69 and the clutch mechanism 44 is carried upon the end of such overhanging section. The driven shaft 57 is provided with a sliding gear cluster formed of gears 70 and 71. Sliding gear 59 is adapted to be actuated by the shifter fork 11 to effect a direct drive between the shafts 56 and 57 and also is adapted to be moved into engagement with the gear 65 on the countershaft 64. In such position, a third speed connection is effected.

The sliding gears 70 and 71 are adapted to be moved into engagement, respectively, with gears 67 and 68 by means of the shifter fork 10 to effect second and first speed connections. The reverse shifter fork 30 engages a gear 72 which is slidably mounted upon a reverse countershaft 73 to which is secured a gear 74 which is adapted to engage gear 66. Gear 72 is adapted to be moved into engagement with an idler gear and a gear on the driven shaft in the usual fashion to effect a reverse speed connection.

It will thus be seen that a transmission has been provided wherein the reverse and fifth speed mechanisms are controlled by elements which are mounted upon a common member. Moreover, an effective locking mechanism is provided to prevent the accidental shifting of the transmission mechanism into these speed connections and an effective fifth speed mechanism is provided in combination with a standard four-speed transmission.

While the invention has been described with specific reference to the accompanying drawings, it is not to be limited, save as defined in the appended claims.

I claim as my invention:

1. A transmission mechanism having a plurality of forward speed shifting means and a reverse speed shifting means, shifter fingers on the shifter means terminating in a vertical plane, a shifter lever movable vertically to effect selecting operations, a plunger aligned with the ends of the fingers, means on the plunger to engage the finger engaging end of the shifter lever, and a spring loaded ball to resist motion of the plunger in two directions.

2. A transmission mechanism having a plurality of forward speed shifting means and a reverse speed shifting means, shifter fingers on the shifter means terminating in a vertical plane, a shifter lever movable vertically to effect selecting operations, a plunger aligned with the ends of the fingers, means on the plunger to engage the finger engaging end of the shifter lever, a spring loaded ball to resist motion of the plunger in two directions, and means to limit motion of the plunger in either direction.

3. A transmission mechanism having a plurality of forward speed shifting means and a reverse speed shifting means, shifter fingers on the shifter means terminating in a common plane, a shifter lever movable in the last named plane to effect selecting operations, a plunger aligned with the ends of the fingers, means on the plunger to engage the finger engaging end of the shifter lever, and a spring loaded ball to resist motion of the plunger in two directions.

4. A transmission mechanism having a plurality of forward speed shifting means and a reverse speed shifting means, shifter fingers on the shifter means terminating in a vertical plane, a shifter lever movable vertically to effect selecting operations, a plunger aligned with the ends of the fingers, means on the plunger forming an elongated groove in a plane parallel to the planes of movement of the fingers to engage the finger engaging end of the shifter lever, means on the plunger to engage and lock all but a selected finger against movement, a spring loaded ball to resist motion of the plunger in two directions, and means to limit motion of the plunger in either direction.

5. A transmission mechanism having a plurality of forward speed shifter shafts, a sleeve within the transmission mechanism mounted for free sliding movement on one of the shafts and constituting, with said shaft, a unitary assembly, means operated by the sleeve to effect a reverse speed shifting operation, means to actuate the sleeve and last named shaft independently, and a fork on the sleeve engaging an adjacent shifter shaft to cause the sleeve to move in a desired plane.

KEITH R. MANVILLE.